(12) United States Patent
Lukasse et al.

(10) Patent No.: US 8,948,920 B2
(45) Date of Patent: Feb. 3, 2015

(54) CONTROLLING TEMPERATURE IN A REFRIGERATED TRANSPORT CONTAINER

(75) Inventors: Leijn Johannes Sjerp Lukasse, Ede (NL); Poul Kim Madsen, Løgumkloster (DK); Lars Mou Jessen, Nordborg (DK)

(73) Assignee: A.P. Moller—Maersk A/S, Copenhagen (DK)

( * ) Notice: Subject to any disclaimer, the term of this patent is extended or adjusted under 35 U.S.C. 154(b) by 440 days.

(21) Appl. No.: 13/428,152

(22) Filed: Mar. 23, 2012

(65) Prior Publication Data
US 2013/0248168 A1 Sep. 26, 2013

(51) Int. Cl.
*G06F 19/00* (2011.01)
(52) U.S. Cl.
USPC .......................................... 700/276; 162/159
(58) Field of Classification Search
CPC ....... B60P 3/20; F25D 11/003; F25D 29/003; F25D 2331/804; F25B 2700/1933; F25B 2700/21173; F25B 27/00
USPC ............... 700/276; 162/159; 62/216, 90, 419, 62/426, 408
See application file for complete search history.

(56) References Cited

U.S. PATENT DOCUMENTS

| | | | |
|---|---|---|---|
| 5,209,072 A | 5/1993 | Truckenbrod et al. | |
| 5,860,594 A | 1/1999 | Reason et al. | |
| 5,946,933 A * | 9/1999 | Clarke et al. | 62/408 |
| 6,058,716 A | 5/2000 | Reason et al. | |
| 6,471,398 B2 * | 10/2002 | Ukai | 374/169 |
| 6,679,071 B1 * | 1/2004 | Storey et al. | 62/126 |
| 7,937,962 B2 * | 5/2011 | Dudley et al. | 62/200 |
| 8,461,958 B2 * | 6/2013 | Saenz et al. | 340/3.1 |
| 2011/0156877 A1 * | 6/2011 | Wong et al. | 340/10.1 |
| 2012/0111044 A1 * | 5/2012 | Chen et al. | 62/207 |

FOREIGN PATENT DOCUMENTS

WO 2011008649 1/2011

OTHER PUBLICATIONS

European Search Report from corresponding European Application No. 12160941.6, dated Sep. 6, 2012.

* cited by examiner

*Primary Examiner* — Kidest Bahta
(74) *Attorney, Agent, or Firm* — Renner, Otto, Boisselle & Sklar, LLP

(57) ABSTRACT

Temperature is controlled in a refrigerated transport container comprising a transport volume, a control unit, a cooling space, one or more fans providing air flow through the cooling space, where air passing through the cooling space passes a return air temperature sensor, a cooling unit, and a supply air temperature sensor. Supply air temperature (Tsup) is controlled to bring temperatures in the transport volume within a desired temperature range around a first temperature set point (Tset). The supply air temperature (Tsup) or a time-averaged function thereof is controlled to reach a temperature below the set point (Tset) during a first limited time period; and the supply air temperature (Tsup) is increased during a second limited time period following said first time period, so that the supply air temperature (Tsup) or a time-averaged function thereof at the end of said second time period is within said desired temperature range.

16 Claims, 6 Drawing Sheets

CONTROLLING TEMPERATURE IN A REFRIGERATED TRANSPORT CONTAINER

TECHNICAL FIELD

The invention relates to controlling temperature in a refrigerated transport container comprising at least a transport volume, a control unit, and a cooling space, one or more fans providing an air flow through the cooling space, where air passing through the cooling space passes at least a return air temperature sensor for measuring a return air temperature, a cooling unit, and a supply air temperature sensor for measuring a supply air temperature.

BACKGROUND

Temperature in a refrigerated transport container, or another kind of refrigerated storage space, is typically controlled within a temperature range adjacent to a set point or target temperature (in the following referred to as set point temperature, set point or first set point). The refrigerated transport container may for example comprise an insulated enclosure divided in a cooling space and a transport volume. Typically, the transport volume is loaded with perishable product such as meat, vegetables and fruit, etc. The set point temperature is then typically chosen to reduce quality degradation of the perishable product.

The cooling space may e.g. be separated from the transport volume by a panel equipped with one or more openings to allow a return air flow from the transport volume into the cooling space and a supply air temperature flow from the cooling space into the transport volume.

The air flow through the cooling space typically passes at least a return air temperature sensor, a device for reducing the temperature of the passing air, e.g. a cooling unit or system, and a supply air temperature sensor. In such systems, the return air temperature sensor typically measures the temperature of air returning from the transport volume while the supply air temperature sensor measures the temperature of air supplied to the transport volume.

Temperature control protocols may selectively control a cooling unit coupled to the refrigerated transport container in order to maintain temperatures in the transport volume within a temperature range adjacent to the set point temperature.

One typical type of a cooling unit or refrigeration unit used in refrigerated transport containers is based on the so-called vapour compression refrigeration cycle. This cycle comprises at least a compressor, a condenser, an expansion device, an evaporator and a capacity regulating device. The compressor sucks refrigerant vapour from the evaporator and compresses the refrigerant vapour which subsequently flows to the condenser at high pressure. The condenser ejects its heat to a medium outside the refrigerated transport container while condensing the refrigerant vapour. The liquefied refrigerant then flows to the expansion device in which a refrigerant pressure drops. The low pressure refrigerant then flows to the evaporator where the refrigerant evaporates while extracting the required heat from the refrigerated transport container.

Other typical cooling units or refrigeration units used in refrigerated transport containers may be different.

Temperatures in the transport volume are typically unmeasured. In a steady state operation, measured supply air temperature may normally be a fairly accurate representative of a coldest temperature in the transport volume. In the steady state operation, measured return air temperature may usually be a reasonable representative of average temperature in the transport volume. In the steady state operation, a warmest temperature in the transport volume is usually a little higher than return air temperature, but remains unknown and e.g. depends on the way the product is stowed inside the container.

For frozen commodities, typically shipped at set points below −10 to −5° C. and usually around −20° C., it is especially important that product temperature is not too far above set point. Therefore, in frozen operation at set points below −10 to −5° C., it is common practice to control a measured return air temperature closely to the set point.

For chilled commodities, typically shipped at set points above −10 to −5° C., both too high and too low product temperatures are undesirable. The adverse effect of too high above set point is fairly obvious; that is the whole reason why refrigeration is applied. However being too low below set point, chilled commodities may actually suffer as well. Many chilled commodities are susceptible to freezing injury, which especially becomes an issue when sensitive commodities like grapes are shipped at set points just above their freezing point. Some chilled commodities are susceptible to chilling injury, e.g. like bananas turning grey in home fridges. Therefore in chilled mode operation at set points above −10 to −5° C., it is common practice to control a measured supply air temperature closely to the set point.

Traditionally, refrigerated transport containers used to be stuffed with product which was already pre-cooled to a temperature close to set point, so transport volume temperatures were always more or less in the steady state condition.

The current trend however, is that ever more containers are stuffed with warm product right after harvest, whereby it is up to the container's cooling unit to reduce product temperature from stuffing temperature to a temperature range adjacent to the set point temperature. In the banana trade for example, it is now standard operations procedure to load uncooled bananas of around 25° C. in containers operating at a set point of about 13.5° C. In these non-steady state conditions, return air temperature becomes a poor indicator of the warmest temperature inside the transport volume.

Typically, the warmest temperature converges a lot slower to a temperature range adjacent to a set point temperature than return air temperature.

In view of the increasing number of warmly-stuffed containers, there is a need to effectively and efficiently manipulate measured supply and return air temperature in order to ensure that actual transport volume temperatures reside as much as possible and as quickly as possible within a desired temperature range adjacent to a set point temperature, while limiting the risk of inflicting chilling and/or freezing injury at set points above −10° C.

SUMMARY

Therefore, it is an object of embodiments of the invention to provide a method of controlling temperature in a refrigerated transport container that allows temperatures throughout the transport volume to reach the desired temperature range quickly, when the product during loading was distinctly warmer than desired, while at the same time reducing quality loss due to high as well as low temperatures.

According to embodiments of the invention the object is achieved in a method of controlling temperature in a refrigerated transport container, the refrigerated transport container comprising at least a transport volume, a control unit, and a cooling space, one or more fans providing an air flow through the cooling space, where air passing through the cooling space passes at least a return air temperature sensor for measuring a return air temperature, a cooling unit, and a supply air temperature sensor for measuring a supply air temperature, wherein the method comprises controlling supply air temperature to bring temperatures in the transport volume within a desired temperature range around a first temperature set point. The object is achieved when the method comprises controlling the supply air temperature or a time-averaged function thereof to reach a temperature below said first temperature set point during a first limited period of time; and increasing the supply air temperature during a second limited period of time following said first period of time, so that the supply air temperature or a time-averaged function thereof at the end of said second period of time is within said desired temperature range.

When the supply air temperature or a time-averaged function thereof is reduced to a temperature below set point it helps to accelerate the rate at which product temperatures throughout the transport volume reach the desired temperature range. This especially counts when the product during loading was distinctly warmer than desired. Many perishable products suffer from too high temperatures, but also from too low temperatures. Reducing supply air temperature below set point helps to combat quality-loss due to too high temperatures. Limiting the duration of this colder-than-desired supply air temperature helps to reduce quality-loss due to too low temperatures. If the duration of the first and second time period are properly chosen the procedure can even be ran without product temperature at any time and any location in the transport volume falling below the desired temperature range.

In one embodiment, the method comprises controlling the supply air temperature or a time-averaged function thereof to a supply air temperature set point; setting the supply air temperature set point during said first period of time to a value below said first temperature set point; and increasing the supply air temperature set point during said second period of time, so that the supply air temperature set point at the end of said second period of time is equal to said first temperature set point. By controlling the supply air temperature to a supply air temperature set point that is temporarily set below the first temperature set point an expedient embodiment that accelerates the rate of product temperature pull down in the transport volume is achieved.

The method may further comprise determining in a master controller said supply air temperature set point as a function of at least one of said first temperature set point and measured values of the return air temperature and the supply air temperature; and controlling in a slave controller the supply air temperature to said supply air temperature set point. Thus the desired temporary supply air temperature undershoot during the first part of a trip may be implemented by a so-called master-slave controller, in which a slave-controller takes care of the supply air temperature control, while a master-controller manipulates the supply air temperature set point used by the slave controller in order to control the process of product temperatures in the transport volume. Adjusting the supply air temperature set point as a function of measured values of the return air temperature and/or the supply air temperature introduces feedback. This feedback advantageously offers the possibility to adjust duration and magnitude of supply air temperature undershoot to the observed temperatures.

In one embodiment, the method comprises increasing during a first sub-period of said second period of time the supply air temperature set point from said value below said first temperature set point to an intermediate value between said value below said first temperature set point and the first temperature set point with a first slope; and increasing during a second sub-period of said second period of time the supply air temperature set point from said intermediate value to the first temperature set point with a second slope; wherein each one of said first and second slopes is predetermined or calculated as a function of at least one of said first temperature set point, said supply air temperature set point and measured values of the return air temperature and the supply air temperature. By gradually ramping up the supply air temperature set point, as opposed to imposing stepwise changes, only minor adjustments are required from the cooling unit and no disturbances to possible other control loops are caused. Stepwise increases of supply air temperature set point might even evoke unintended heating demand. This is advantageously avoided. Subdividing the supply air temperature set point ramp-up period in two separate ramp-up sub-periods offers the attractive possibility of inserting a third sub-period in between with supply air temperature set point at an intermediate value.

In such embodiment, the method may further comprise maintaining during a third sub-period arranged between said first and second sub-periods of said second period of time the supply air temperature set point at said intermediate value. Maintaining the supply air temperature set point at an intermediate value during a third limited sub-period advantageously combines accelerated pull down of temperatures at warm spots in the transportation volume with the guarantee that the coldest product temperatures will not drop below this intermediate value. Especially when it is known that a product temperature at said intermediate value will only cause chilling/freezing injury after a known amount of time, it may be advantageous to set the supply air temperature set point at this intermediate value for at most said limited amount of time.

In one embodiment, said first period of time may have a duration of less than 10 hours, said second period of time may have a duration of less than 90 hours; and said value below said first temperature set point may be between 0.5 and 4° C. below said first temperature set point.

In some embodiments, said value below said first temperature set point may also be below said desired temperature range around a first temperature set point. By reducing supply air temperature or a time-averaged function thereof to a temperature that is not only below the first set point, but even to a temperature below said desired product temperature range, an even faster pull down, and thus an even larger advantage is achieved.

In another embodiment, the method comprises constraining the supply air temperature or a time-averaged function thereof to be above a minimum constraint; and increasing the minimum constraint over time. The advantage of imposing a minimum constraint on supply air temperature or a time-averaged function thereof is that it does not impose, but only provides the possibility of a temporary undershoot during the first part of a trip and subsequently reduces the possibility for undershoot by increasing the minimum constraint when time proceeds, while product temperatures approach set point. Whether the undershoot really takes place is left to other elements in the temperature control. E.g. a controller controlling the average of supply air temperature and return air temperature to a first temperature set point would only call upon the possibility to undershoot if return air temperature is above a first temperature set point.

Some embodiments of the invention also relate to a system for controlling temperature in a refrigerated transport container, the refrigerated transport container comprising at least a transport volume and a cooling space, one or more fans providing an air flow through the cooling space, where air passing through the cooling space passes at least a return air temperature sensor for measuring a return air temperature, a cooling unit, and a supply air temperature sensor for measuring a supply air temperature, wherein the system comprises a control unit configured to control supply air temperature to bring temperatures in the transport volume within a desired temperature range around a first temperature set point. The control unit is configured to control the supply air temperature or a time-averaged function thereof to reach a temperature below said first temperature set point during a first limited period of time; and increase the supply air temperature during a second limited period of time following said first period of time, so that the supply air temperature or a time-averaged function thereof at the end of said second period of time is within said desired temperature range.

Embodiments corresponding to those mentioned above for the method also apply for the system, with the same advantages.

In some embodiments, the control unit is configured to determine, without human intervention, whether at least one indicator indicates that temperatures in the transport volume are distinctly above said desired temperature range, wherein said at least one indicator is a function of at least one of the duration of preceding power off periods, measured return air temperature and measured supply air temperature within a predetermined amount of time after activation of the controller; and reduce the supply air temperature or a time-averaged function thereof to said temperature below said first temperature set point only if said at least one indicator indicates that temperatures in the transport volume are distinctly above the said desired temperature range.

Reducing supply air temperature or a time-averaged function thereof to said temperature below the first temperature set point in every shipment carries the risk of inflicting freezing/chilling-injury on products that have been pre-cooled prior to loading. Calling upon a temporary temperature undershoot only if the at least one indicator indicates that temperatures in the transport volume are distinctly above the desired temperature range advantageously reduces this risk.

In some embodiments, the control unit is configured to check upon activation of the controller if and since when the controller state at the end of the preceding power-on period was in said first period of time or in said second period of time; and taking that information into account when initializing the supply air temperature controller. In this way a system that is more robust to short interruptions of the electric power supply is obtained in that the undershoot is only initiated at the start of a trip, identified by the occurrence of a preceding multi-days power off period, and the controller state in the midst of said first or second period of time is resumed, if that is where the controller was operating when it powered down.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION

Figure 1:
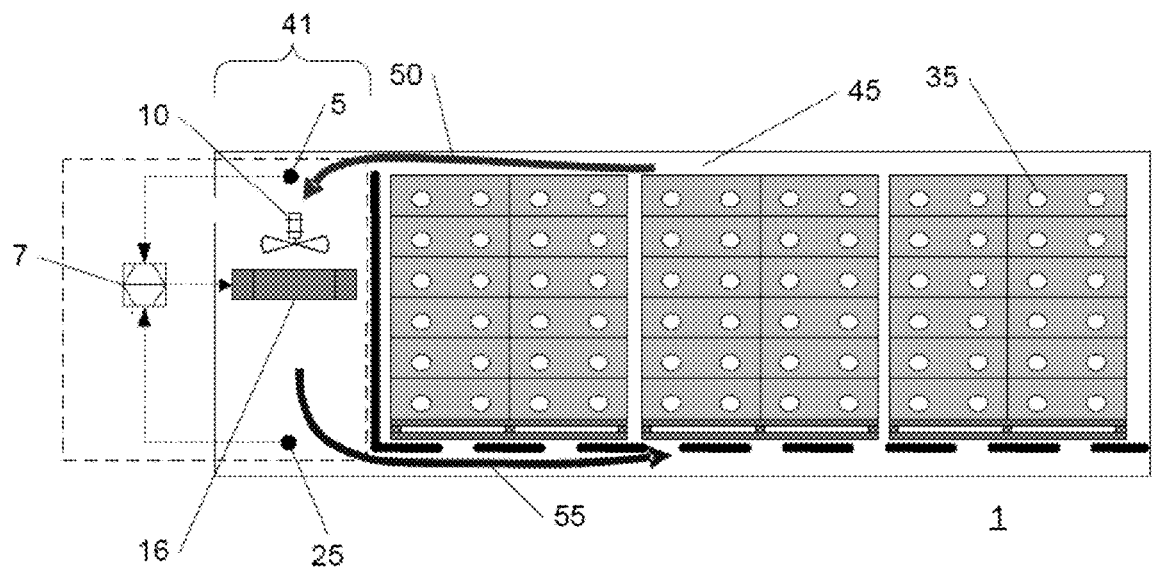
FIG. 1 shows a simplified longitudinal cross-sectional view of a refrigerated transport container.

FIG. 1 schematically illustrates a simplified longitudinal cross-sectional view of a refrigerated space in the form of a refrigerated transport container.

Shown is one example of a refrigerated transport container 1, or another type of refrigerated storage space, comprising at least a transport volume 45, a control unit 7, and a cooling space 41. The cooling space 41 may be situated inside an insulated enclosure of the transport container 1 and may (as shown) be separated from the transport volume 45 by a panel or the like equipped with one or more openings to allow a return air flow 50 into the cooling space 41 and a supply air flow 55 out of the cooling space 41.

The air flow through the cooling space may be maintained by for example one or more fans 10, e.g. evaporator fans, or one or more other units providing a similar function. On its way through the cooling space 41, air successively passes at least a return air temperature sensor 5, the one or more fans 10, a cooling unit or system 16 (or one or more other units with a similar function) reducing the temperature of the passing air, and a supply air temperature sensor 25.

In this kind of system, the return air temperature sensor 5 measures the temperature of air returning from the transport volume (in the following denoted Tret), while the supply air temperature sensor 25 measures the temperature of air supplied to the transport volume (in the following denoted Tsup).

Unmeasured temperatures in the transport volume (45) are controlled by the controller 7 to be within a desired temperature range adjacent to a target or set point temperature (Tset) suitable for the products contained in the transport volume 45. As an example, for bananas or similar products the desired temperature range could be 13 to 15° C. and the set point temperature (Tset) could then be set to 13.5° C. For some products the set point temperature could be equal to the lower limit of the desired temperature range. In traditional chilled respectively frozen mode operation, the supply respectively return air temperature is controlled to the set point Tset with the purpose of maintaining the temperatures in the transport volume within the desired temperature range.

Figure 2:
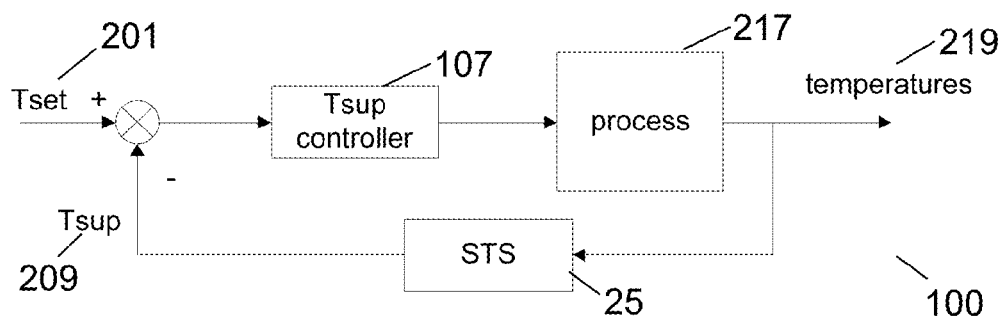
FIG. 2 shows an example of a block diagram representing a traditional supply air temperature controller.

FIG. 2 schematically illustrates an example of a block diagram representing a traditional supply air temperature controller used in chilled mode operation. In the block diagram, the process 217 represents temperature dynamics within a refrigerated transport container (see e.g. 1 in FIG. 1). Though each location in the refrigerated transport container has its own temperature 219, only two temperatures are measured: a Return air Temperature Sensor (RTS) 5 measures the return air temperature Tret 213 and a Supply air Temperature Sensor (STS) 25 measures the supply air temperature Tsup 209. In the traditional controller, typically only one of these temperatures is used in the control loop. In FIG. 2, the supply air temperature Tsup 209 is measured by STS 25 and compared to the set point Tset 201, and the difference is fed to the Tsup controller 107.

Figure 3:
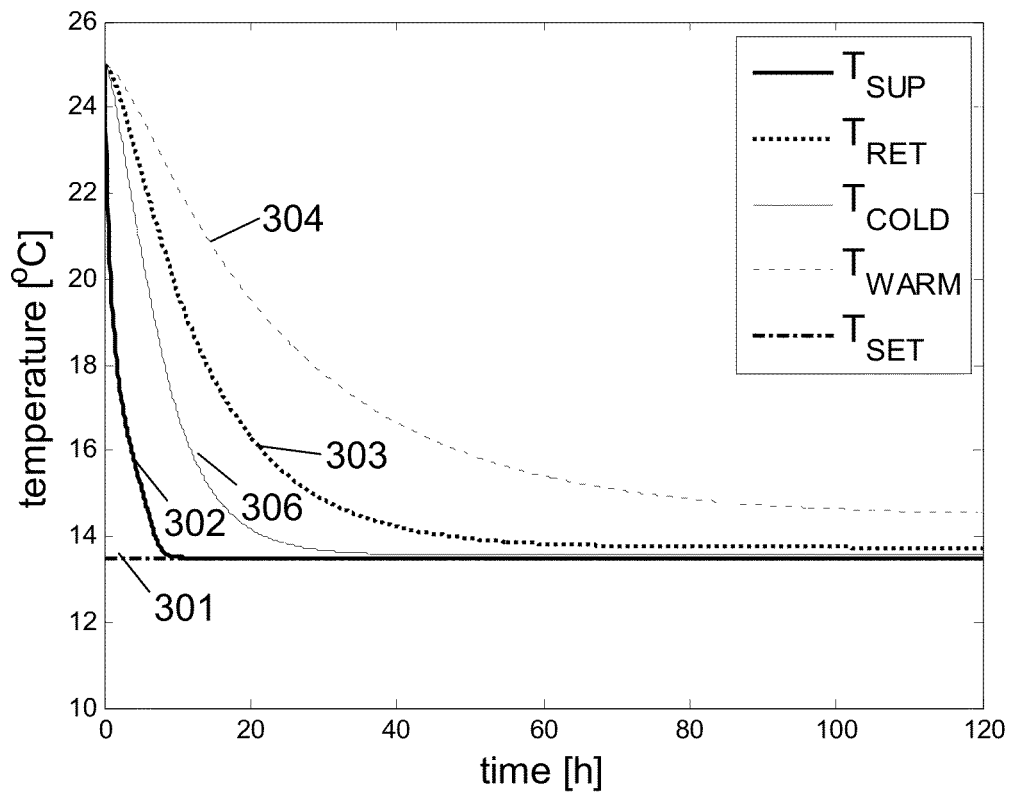
FIG. 3 shows an outcome of a computer simulation with a first set point entered directly into a traditional supply air temperature controller.

FIG. 3 presents the outcome of a computer simulation with a set point (Tset) 301 entered into a traditional controller 107 as the one shown in FIG. 2 and temperature trajectories for a temperature of the supply air flow (Tsup) 302, a temperature of the return air flow (Tret) 303, a warmest product temperature (Twarm) 304 as well as a coldest product temperature (Tcold) 306 in the transport volume. The set point temperature Tset 301 is here 13.5° C., which is typically used for the transport of bananas. In this computer simulation it is supposed that the products are loaded into the container at a temperature around 25° C., i.e. the container is warmly-stuffed. Other set point temperatures can be used for the transport of other products.

In the situation of FIG. 3, Tsup 302 is controlled to the entered Tset 301. This reflects a traditional approach to temperature control in chilled mode operation, i.e. for transport of products with target temperatures above −10 to −5° C. At power up all internal temperatures are more or less equal to the ambient temperature, i.e. 25° C. The supply air temperature will then typically be pulled down to the target temperature Tset within a period of e.g. 5-10 hours. As it can be seen from the figure, the return air temperature Tret and the unmeasured temperatures Twarm and Tcold approach Tset a lot slower. In real shipments the warmest product temperature Twarm 304 and the coldest product temperature Tcold 306 in the transport volume are normally unmeasured, but the computer simulation shows a realistic pattern.

It is noted that wherever this document mentions 'control of supply air temperature to a set point', one could also read 'control of time-averaged supply air temperature to a set point'. As an example, time-averaged could here mean hourly-averaged. Background of this is that the current invention does not require a modulating supply air temperature controller, as it may also go together with whatever kind of on/off-controller for supply air temperature controller.

It is noted that in traditional frozen mode operation, Tret 303 instead of Tsup 302 would be controlled to Tset 301. In that situation, the temperature pull down would proceed at maximum cooling capacity until the curve of Tret 303 reaches set point, regardless how much Tsup 302 undershoots the set point Tset 301. For frozen products this is a suitable method, because the quality of frozen products does not suffer from temperatures lower than the set point, but may indeed suffer from temperatures higher than the set point.

The temperature control described below is more advanced than just controlling supply or return air temperature to a set point Tset, like in traditional chilled respectively frozen mode operation. In the method described below, the supply air temperature Tsup is temporarily allowed to be below the first set point Tset, or even below the lower limit of the desired temperature range, in order to speed up the pull down of product temperatures in the transport volume of a hot-stuffed refrigerated transport container.

The principle is to control the temporary reduction of the supply air temperature during a period, e.g. the first few days of a shipment. This is illustrated in the flow chart 400 in FIG. 4. The process starts with power up in step 401. The controller may then in step 402, either immediately after power up or after the completion of a start up procedure, start to pull the supply air temperature Tsup or a time-averaged function thereof down to a value below the first temperature set point Tset. When this lower value is reached it may either be maintained for some time, or the next step may be activated directly. Step 402 takes place during a first time period. Next, in step 403 the supply air temperature Tsup is increased from this low value and towards the temperature set point Tset during a second time period. When Tset is reached, Tsup is then maintained (step 404) at this temperature or within a desired range around it for the rest of the journey. It is noted that both the first and the second time period have a limited length.

Figure 4:
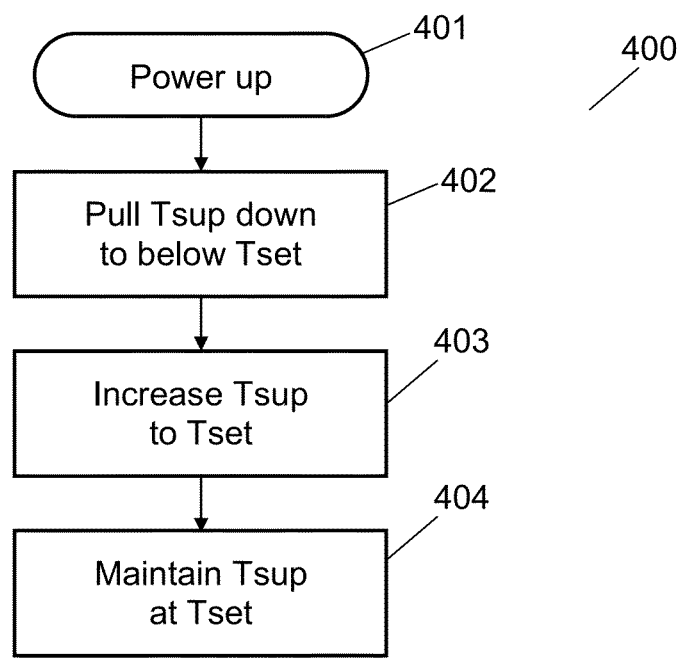
FIG. 4 shows a flow chart illustrating a method of controlling a temporary reduction of supply air temperature during a time period.
Figure 5:
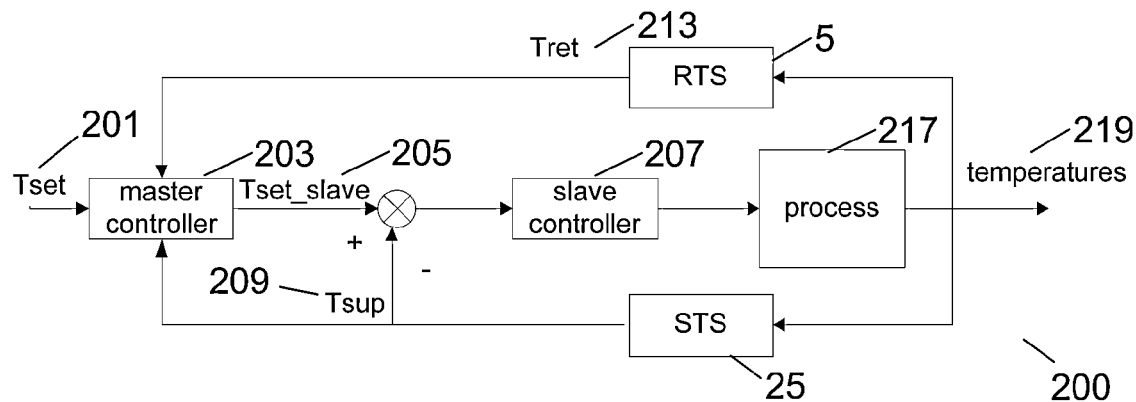
FIG. 5 shows an example of a block diagram representing a master-slave controller according to an embodiment.

As an example, the process of FIG. 4 can basically be implemented by extending the existing perishable-mode supply air temperature controller shown in FIG. 2 with a master-controller as shown in FIG. 5. In that concept the existing supply air temperature controller then becomes a slave controller 207. The master-controller 203 contains an algorithm, an example of which will be described below. The controller 7 may thus e.g. comprise a master-slave controller setup 200 as explained in connection with FIG. 5 or its functionality could be provided in another fashion.

Further aspects and variations will be explained further in the following.

FIG. 5 schematically illustrates a block diagram representing a so-called master-slave controller 200 according to one embodiment. In this embodiment, the process 217 represents temperature dynamics within a refrigerated transport container (see e.g. 1 in FIG. 1). Though each location in the refrigerated transport container has its own temperature 219, only two of them are measured: a Return air Temperature Sensor (RTS) 5 measures the return air temperature Tret 213 and a Supply air Temperature Sensor (STS) 25 measures the supply air temperature Tsup 209.

This block diagram represents a so-called master-slave controller 200 according to one embodiment where an entered first set point Tset 201 generally is first processed in a master controller 203 that based on Tset 201 and current and/or recent values of Tret 213 and possibly Tsup 209 manipulates or derives a second or modified supply air temperature set point Tset_slave 205. The difference between the modified set point Tset_slave 205 and supply air temperature Tsup 209 is then received by the slave controller 207, which then aims to minimize this difference, effectively controlling Tsup 209 to the modified supply air temperature set point Tset_slave 205 by adjusting the amount of heat absorbed by the cooling unit (see e.g. 16 in FIG. 1) in a cooling space of the refrigerated transport container, which in this schematic representation may be regarded to be part of the process 217.

In the present embodiment, the first set point Tset 201 is treated as a set point to a master controller 203 where the master controller 203 manipulates the slave set point Tset_slave 205. To differentiate the two set points, the set point Tset 201 may in the following also be referred to as the first set point. The slave controller 207 then controls the supply air temperature Tsup 209 to the slave supply air temperature set point Tset_slave 205. The master controller deliberately reduces the slave supply air temperature set point Tset_slave 205 below the first master set point Tset 201 during a first limited time period with the objective to accelerate the pull down of product temperatures 219 to the desired temperature range around the first set point Tset 201. By allowing the average Tsup 209 to be below Tset 201 for some time (or even below the lower limit of the desired temperature range for the products in the transport volume) instead of controlling it to Tset, a larger portion of the temperatures 219, including product temperatures, in the container will show a quicker convergence to the desired temperature range adjacent to first set point Tset 201. By increasing the supply air temperature Tsup 209 to the target temperature Tset 201 during a second time period having a limited length, and maintaining Tsup 209 at first set point Tset 201 after that second time period, it is ensured that product temperatures below the target temperature cannot or hardly occur. In this way the products in the container are not harmed by too low temperatures during the initial under-cooling of Tsup 209.

Figure 6:
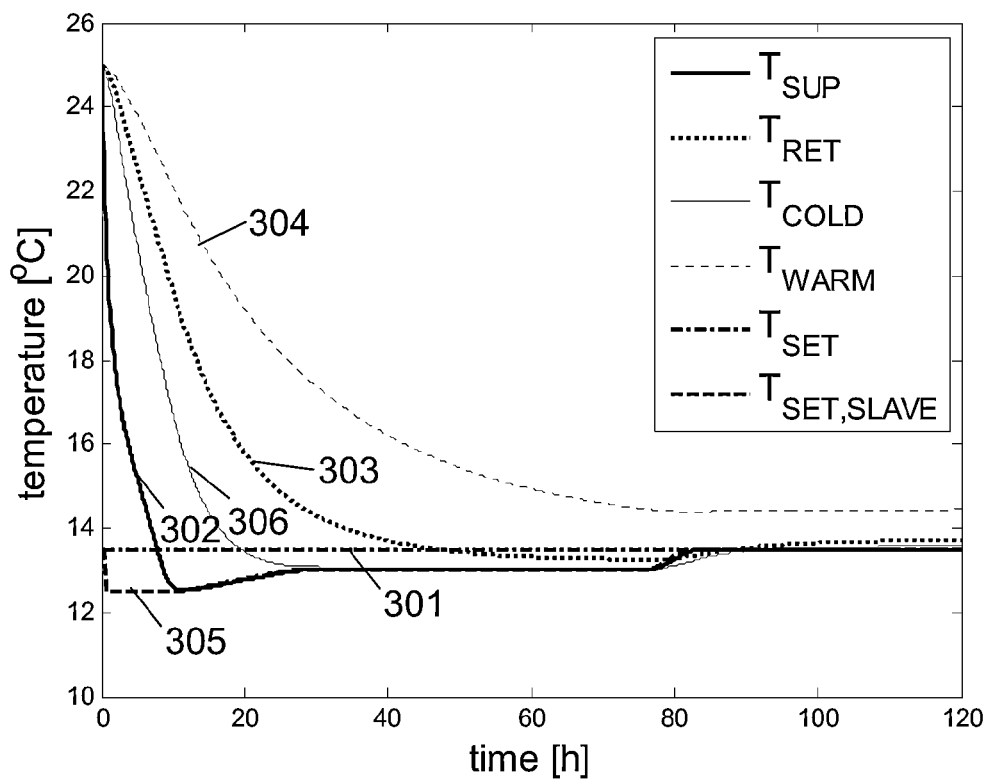
FIG. 6 shows an outcome of a computer simulation with a first set point entered into a master-slave controller.

FIG. 6 shows a computer simulation with simulated trajectories for temperature Tsup 302, Tret 303, Twarm 304 and Tcold 306 resulting from entering the first set point Tset 301 into a master-controller, which then manipulates the slave-controller's supply air temperature set point Tset_slave 305. The slave-controller's supply air temperature set point Tset_slave 305 is adjusted by the master controller, that based on Tset 301, Tret 303 and possibly Tsup 302 manipulates supply air temperature the set point Tset_slave 305 with the objective to control Tsup 302 to a value below Tset 301 for a limited first time period, while the slave controller controls supply air temperature Tsup 302 to the slave set point Tset_slave 305.

Manipulating the supply air temperature set point Tset_slave 305 as a function of the first temperature set point Tset 301 advantageously adjusts Tset_slave 305 to Tset 301, where the adjustment relative to Tset 301 may depend on Tset 301 by e.g. reducing Tset_slave 305 at most 1° C. below Tset 301 when Tset 301 is in a range where chilling-sensitive products are known to be shipped, while allowing a 2° C. reduction in set point ranges where less chilling-sensitive products are shipped. Adjusting the supply air temperature set point Tset_slave 305 as a function of measured values of the return air temperature Tret 303 and/or the supply air temperature Tsup 302 introduces feedback. This feedback advantageously offers the possibility to adjust duration and magnitude of temperature undershoot to the observed temperatures.

This master-slave controller is an implementation of the embodiment depicted in FIG. 5 with the master-controller executing an algorithm as described below in relation to FIG. 7.

Comparing FIG. 3 and FIG. 6 illustrates that a faster temperature pull down, i.e. a faster convergence of product temperatures to the first set point, is achieved due to the master-slave control in FIG. 6, while yet maintaining control over Tsup 302. For example after 40 hours in FIG. 3, Twarm 304 is still 16.5° C., while in FIG. 6 Twarm 304 then is already down to 16.0° C. This is achieved by allowing supply air temperatures Tsup 302 colder than Tset 301 or even colder than the lower limit of the desired temperature range. In general Tsup 302 colder than Tset 301 means an increased risk of chilling injury. However, the period of Tsup 302 colder than Tset 301 only occurs in the beginning of the pull down when temperatures in most locations in the transport volume are still above Tset 301, because as mentioned above, Tset_slave 305 is increased to Tset 301 during the second time period. This will be described in further detail below. Consequentially, product temperatures will not or hardly fall below Tset 301. Hence the risk of chilling injury is very limited while the benefit of faster pull down is clear, namely less quality degradation due to too high temperatures (i.e. the whole idea of applying refrigeration).

Also in frozen mode operation, the master-slave concept described above may be used for example to limit the undershoot of Tsup 302 during temperature pull down like in FIG. 6. This would for example offer the advantage of some energy saving at the expense of a slightly slower pull down of warmest temperature Twarm 304 in the transport volume.

In the embodiment described above, the master controller 203 contains an algorithm that calculates the slave set point Tset_slave in dependence of the first set point Tset and measured (recent and/or current) values of the supply air temperature Tsup and the return air temperature Tret to obtain the results described above. An example of how this algorithm can be implemented is described in the following with reference to the flow chart 500 shown in FIG. 7 and the graphs shown in FIG. 6.

Figure 7:
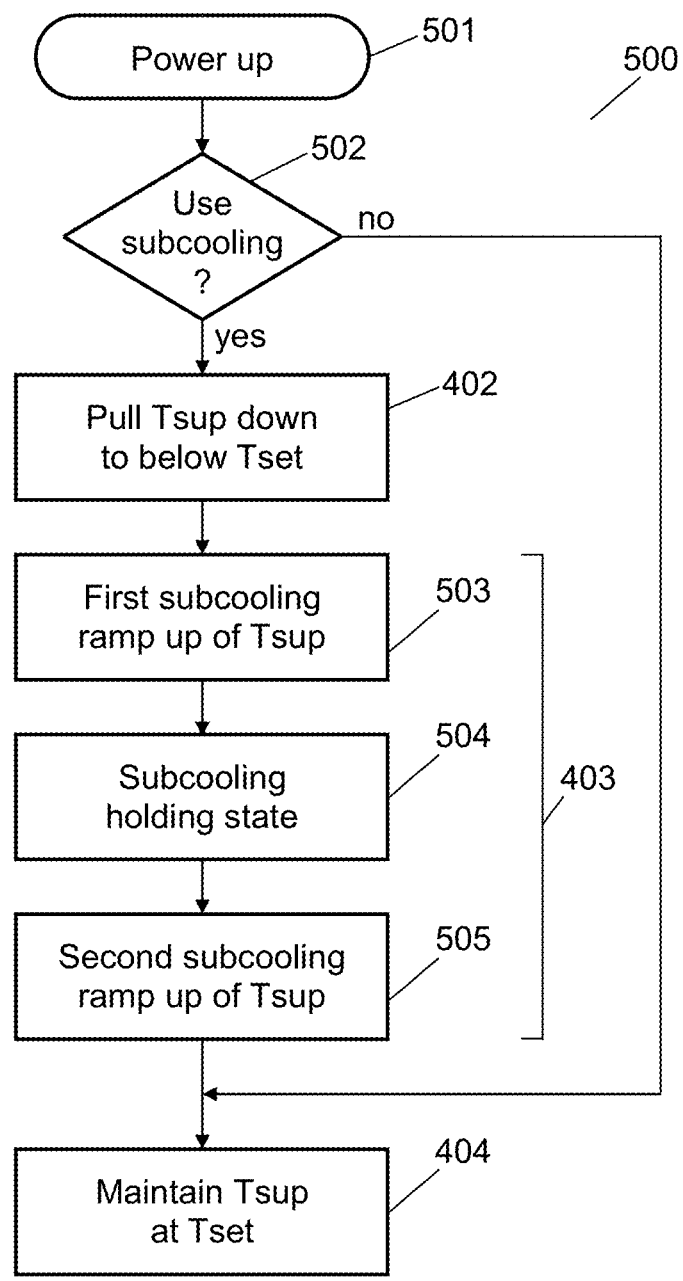
FIG. 7 shows a flow chart illustrating an example of an algorithm implementing the method of FIG. 4.

The algorithm function shown in FIG. 7 is a procedure that consists of 5 steps or states in which the slave set point Tset_slave for the temperature control is calculated in different ways. Some of these steps may in some embodiments be omitted or combined.

When the unit powers up in step 501 after an off period the procedure may either start directly in step 402, or it may first run through a start up procedure 502, in which it is decided whether the subcooling procedure of steps 402 to 505 should actually be used or not. An example of such a start up procedure 502 is illustrated in more detail in the flow chart in FIG. 8. First it is checked in step 511 if the off period has lasted for more than 96 hours. If this is the case, a 'pulldown-completed flag' is set to FALSE in step 512, and the supply air temperature Tsup is then controlled to the first set point Tset for 30 minutes in step 513. If, however, the off period has not lasted for more than 96 hours it is checked in step 514 if the 'pull-down-completed flag' is TRUE. If the flag is already FALSE, the supply air temperature Tsup is then controlled to the first set point Tset for 30 minutes in step 513 as before. Otherwise, the procedure goes to step 404, i.e. traditional regulation of the supply air temperature without the subcooling procedure. After 30 minutes in step 513 it is checked in step 515 whether the return air temperature Tret is higher than Tset+3° C. If so, the subcooling procedure is started in step 402. Otherwise, traditional regulation of the supply air temperature is used in step 404. In other words, the subcooling pull down step is only started when the following conditions becomes true: The unit has been running for more than 30 minutes in traditional mode with Tret higher than Tset+3° C. AND the 'pulldown-completed flag' is FALSE.

Figure 8:
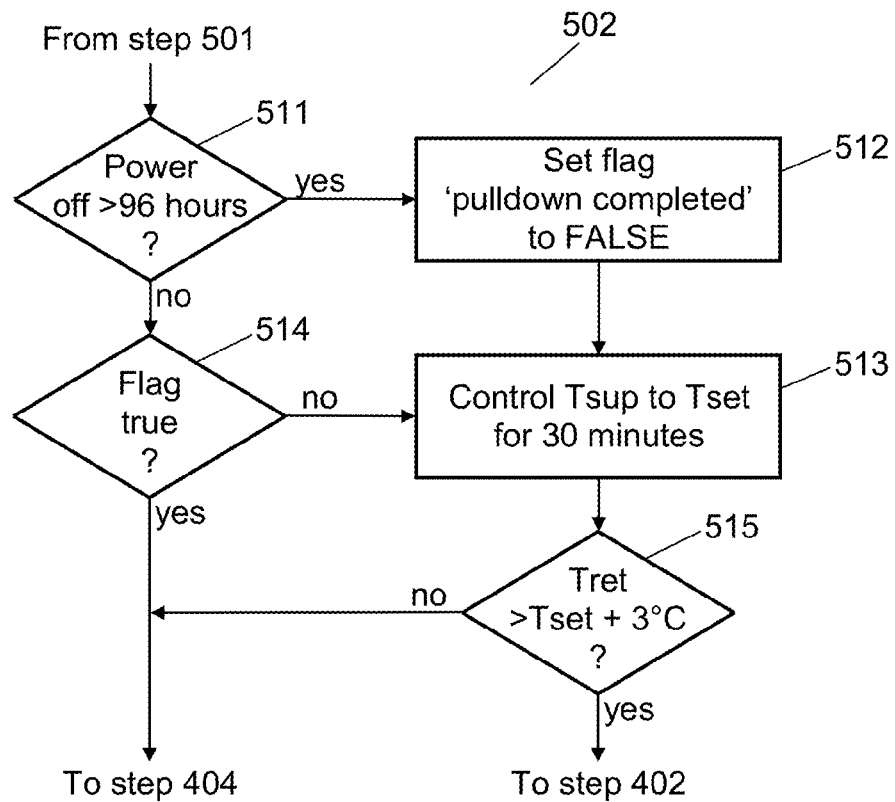
FIG. 8 shows a flow chart illustrating a possible implementation of a start up procedure for the algorithm of FIG. 7.

The embodiment in FIG. 8 is a possible embodiment of determining, without human intervention, whether at least one indicator indicates that temperatures in the transport volume are distinctly above the desired temperature range, wherein said at least one indicator is a function of at least one of the duration of preceding power off periods, measured return air temperature and measured supply air temperature within a predetermined amount of time after activation of the controller; and reduce the supply air temperature or a time-averaged function thereof to said temperature below said first temperature set point only if said at least one indicator indicates that temperatures in the transport volume are distinctly above the said desired temperature range. Reducing supply air temperature or a time-averaged function thereof to said temperature below the first temperature set point in every shipment carries the risk of inflicting freezing/chilling-injury on products that have been pre-cooled prior to loading. Calling upon a temporary temperature undershoot only if the at least one indicator indicates that temperatures in the transport volume are distinctly above the desired temperature range advantageously reduces this risk.

Figure 9:
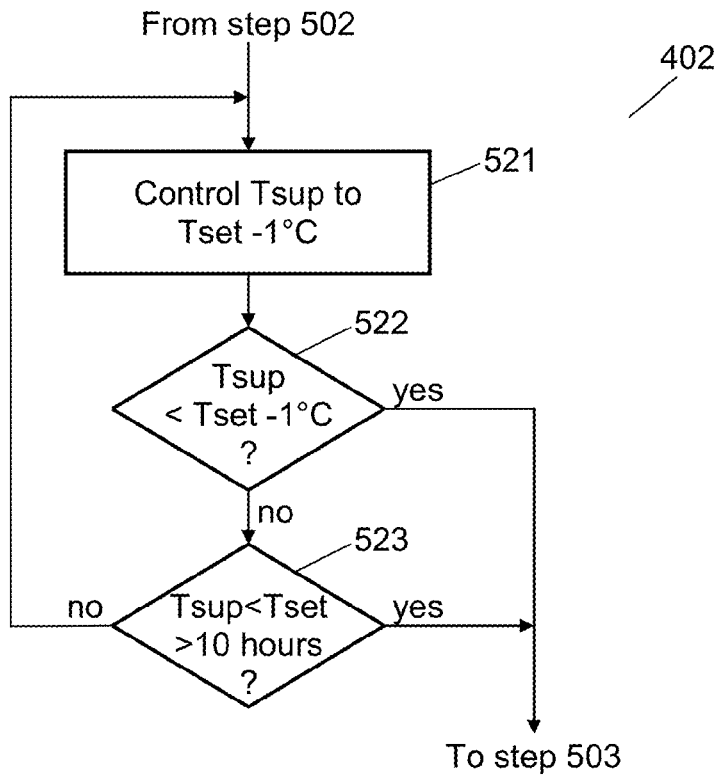
FIG. 9 shows a flow chart illustrating a possible implementation of a subcooling pull down step of the algorithm of FIG. 7.

In the subcooling pull down step 402 in FIG. 7, which is shown in more detail in FIG. 9, the supply air temperature Tsup is controlled in step 521 to reach a value below the first set point Tset. In this embodiment this value is set to Tset−1° C. As mentioned before, this value may be below the lower limit of the desired temperature range for the temperatures in the transport volume. This is done by setting the slave set point Tset_slave to Tset−1° C., as it is also illustrated in FIG.

6. The step is stopped when Tsup has reached Tset−1° C. or if Tsup has been below Tset for 10 hours. Thus in step 522 it is checked if Tsup<Tset−1° C., and in step 523 it is checked if Tsup has been below Tset for more than 10 hours. The pull down step 402 may be followed by a holding step (not shown), where Tset_slave, and thus Tsup, is kept at Tset−1° C. for some time, or step 403 may be initiated as soon as Tsup reaches Tset−1° C. If the unit is power cycled during the pull down state the pull down state is resumed after restart.

In the embodiment depicted in FIG. 7, step 403, in which the supply air temperature is increased to the first set point Tset, is divided into three steps, i.e. a first subcooling ramp up step 503, a subcooling holding step 504 and a second subcooling ramp up step 505. The subcooling state 403 follows the pull down step 402.

Figure 10:
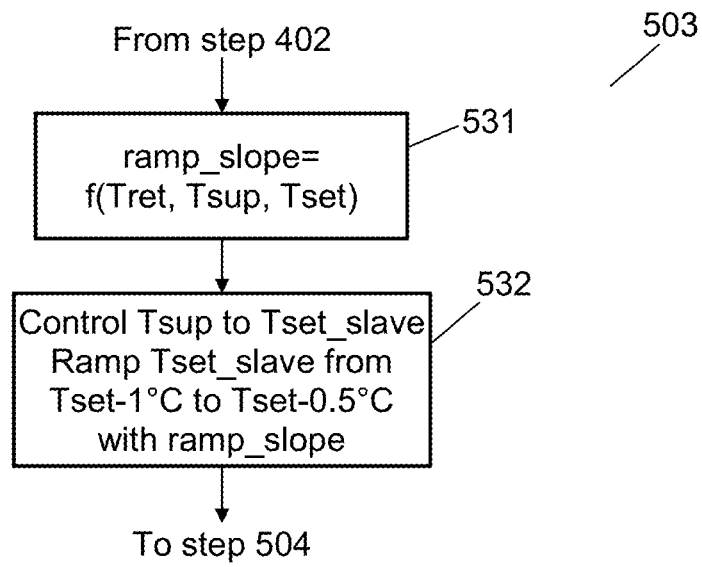
FIG. 10 shows a flow chart illustrating a possible implementation of a first subcooling ramp up step of the algorithm of FIG. 7.

The steps taken in the first subcooling ramp up step 503 are schematically depicted in FIG. 10. Upon entering this state, a ramp slope is first determined in step 531 by evaluating the following equations:

$$\text{time constant} = 6 \text{ hours}$$

$$T_{ini} = \min(T_{return}, T_{supply} - \text{slope of } T_{supply} * \text{time constant})[^\circ C.] \quad (1)$$

$$t_{cold\_pd} = -\text{time constant} \times \ln\left(\frac{1}{T_{ini} - (T_{set} - 1)}\right)[h] \quad (2)$$

$$\text{ramp\_slope} = 0.5/(t_{cold\_pd} + 5)[^\circ C./h] \quad (3)$$

where
Tini=estimated coldest product temperature upon entry of this state [° C.].
$t_{cold\_pd}$=estimated time till coldest product temperature reaches Tset, assuming Tsup=Tset−1° C. [h].
ramp_slope=slope at which Tset_slave ramps up during the first subcooling ramp-up step 503 [° C./h].

During the first subcooling ramp up step the slave set point Tset_slave is ramped in step 532 of FIG. 10 at ramp_slope ° C./h from slave set point at the end of the pull down state (=Tset−1° C.) to an intermediate value, e.g. Tset minus 0.5° C. The first subcooling ramp up state is terminated when Tset_slave reaches Tset−0.5° C. If the unit is power cycled during the first subcooling ramp up state the first subcooling ramp up state is resumed after restart and Tset_slave continues to ramp up from its most recent value.

The subcooling holding state (step 504 in FIG. 7) follows the first subcooling ramp up step 503. During the subcooling holding state 504 Tset_slave is kept at Tset−0.5° C. In the current embodiment, the subcooling holding state 504 is terminated after 50 power on hours. Other lengths of this state may be used instead of the 50 hours, and the step may also be omitted, so that the first subcooling ramp up state 503 is directly followed by the second subcooling ramp up state 505. If the unit is power cycled during the subcooling holding state the subcooling holding state is resumed after restart and the time counter continues to count from its most recent value.

Figure 11:
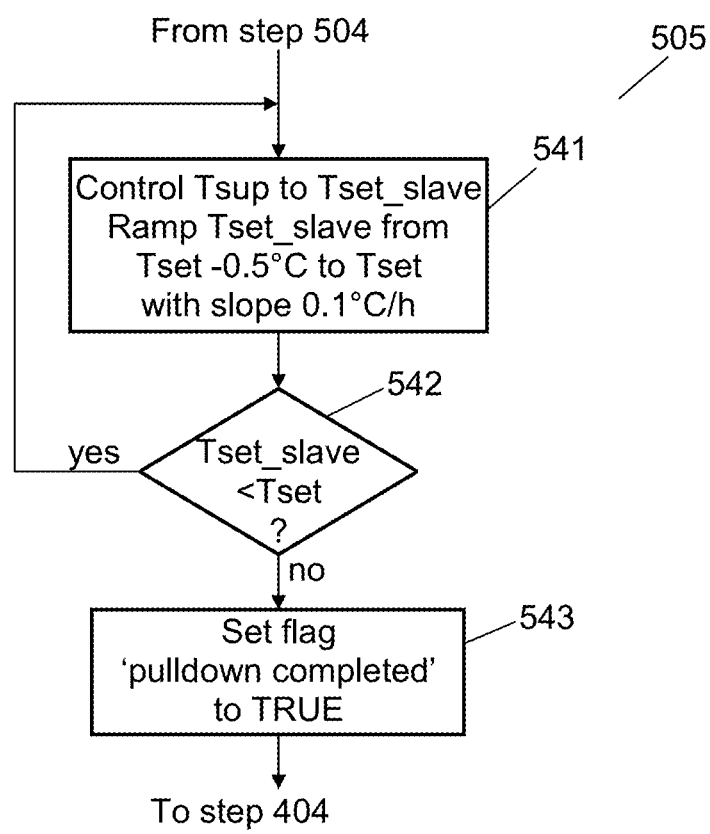
FIG. 11 shows a flow chart illustrating a possible implementation of a second subcooling ramp up step of the algorithm of FIG. 7.

The second subcooling ramp up state 505 follows the subcooling holding state 504. The algorithm used in state 505 is shown in more detail in FIG. 11. During state 505 Tset_slave is ramped in step 541 from Tset_slave at the end of the Subcooling holding state to Tset at a rate of 0.1° C./h. The second subcooling ramp up state is terminated when Tset_slave reaches Tset (step 542). Upon completion of this state the 'pulldown-completed flag' is set to TRUE in step 543.

It is noted that step 403, in which the supply air temperature is gradually increased to the first set point Tset, and which in the embodiment described above comprises the three sub steps 503, 504 and 505, has a limited duration or length to minimize the risk of under-cooling the product in the container. The duration of step 403 may typically be less than 90 hours.

If the unit is power cycled during the second subcooling ramp up state 505 the normal operation state is started after power up, using Tset_slave=Tset. It is noted that the motivation for the difference compared to the power off handling during the first subcooling ramp up state 503 is that after a power cycle during the second subcooling ramp up state 505 it is no longer useful to reduce the supply air temperature set point below the first set point Tset for only a few hours.

Regarding power cycling, it is noted that in some embodiments, the control unit is configured to check upon activation of the controller if and since when the controller state at the end of the preceding power-on period was in said first period of time or in said second period of time; and taking that information into account when initializing the supply air temperature controller. In this way a system that is more robust to short interruptions of the electric power supply is obtained in that the undershoot is only initiated at the start of a trip, identified by the occurrence of a preceding multi-days power off period, and the controller state in the midst of said first or second period of time is resumed, if that is where the controller was operating when it powered down.

When the second subcooling ramp up state 505 is completed, i.e. Tset_slave reaches Tset, cooling is continued in the normal state in step 404, where the supply air temperature Tsup is then maintained at this temperature (i.e. Tset_slave=Tset) or within a desired range around it for the rest of the journey. The state is only terminated if the conditions for pull down start (step 502 in FIG. 7) become true again, which will usually not happen during the same journey.

The algorithm described above represents one embodiment and variations in details are of course possible. As an example it can be mentioned that the subcooling holding step can be omitted, which may then be compensated by reducing the ramp slope used in the two subcooling ramp up states 503 and 505. In that case the two subcooling ramp up states may even use the same ramp slope so that step 403 only contains one subcooling ramp up state. The ramp slope used in this state may then be determined from the measured temperatures, e.g. as suggested in step 503 above, or a fixed ramp slope as suggested in step 505 may be used.

In another embodiment product temperatures in the transport volume 45 are measured. Measuring product temperatures largely reduces the uncertainty about the actual product temperatures. Therefore a wealth of opportunities for simplifications becomes available. For example step 522 and 523 in FIG. 9 could be replaced by: proceed to step 503 if the coldest measured product temperature becomes less than or equal to Tset. Another example would be to decide on proceeding from the subcooling holding state (step 504 in FIG. 7) to the second subcooling ramp up state 505 not just on the basis of elapsed time, but on the basis of measured warmest product temperature, e.g. proceed to second subcooling ramp up state 505 when warmest measured product temperature becomes less than Tset+3° C.

In other embodiments, the method may comprise constraining the supply air temperature or a time-averaged function thereof to be above a minimum constraint; and increasing the minimum constraint over time. The advantage of imposing a minimum constraint on supply air temperature or a time-averaged function thereof is that it does not impose, but only provides the possibility of a temporary undershoot during the first part of a trip and subsequently reduces the possibility for undershoot by increasing the minimum constraint when time proceeds, while product temperatures approach set point. Whether the undershoot really takes place is left to other elements in the temperature control. E.g. a controller controlling the average of supply air temperature and return air temperature to a first temperature set point would only call upon the possibility to undershoot if return air temperature is above a first temperature set point.

Although various embodiments of the present invention have been described and shown, the invention is not restricted thereto, but may also be embodied in other ways within the scope of the subject-matter defined in the following claims.

What is claimed is:

1. A method of controlling temperature in a refrigerated transport container, the refrigerated transport container comprising at least a transport volume, a control unit, and a cooling space, one or more fans providing an air flow through the cooling space, where air passing through the cooling space passes at least a return air temperature sensor for measuring a return air temperature (Tret), a cooling unit, and a supply air temperature sensor for measuring a supply air temperature (Tsup), wherein the method comprises:
controlling supply air temperature (Tsup) to bring temperatures in the transport volume within a desired temperature range around a first temperature set point (Tset);
controlling the supply air temperature (Tsup) or a time-averaged function thereof to reach a temperature below said first temperature set point (Tset) during a first limited period of time;
increasing the supply air temperature (Tsup) during a second limited period of time following said first period of time, so that the supply air temperature (Tsup) or a time-averaged function thereof at the end of said second period of time is within said desired temperature range;
controlling the supply air temperature (Tsup) or a time-averaged function thereof to a supply air temperature set point (Tset_slave);
setting the supply air temperature set point (Tset_slave) during said first period of time to a value below said first temperature set point (Tset); and
increasing the supply air temperature set point (Tset_slave) during said second period of time, so that the supply air temperature set point (Tset_slave) at the end of said second period of time is equal to said first temperature set point (Tset).

2. A method according to claim 1, wherein the method comprises:
determining in a master controller said supply air temperature set point (Tset_slave) as a function of at least one of said first temperature set point (Tset) and measured values of the return air temperature (Tret) and the supply air temperature (Tsup); and
controlling in a slave controller the supply air temperature (Tsup) to said supply air temperature set point (Tset_slave).

3. A method according to claim 1, wherein the method comprises:
increasing during a first sub-period of said second period of time the supply air temperature set point (Tset_slave) from said value below said first temperature set point (Tset) to an intermediate value between said value below said first temperature set point (Tset) and the first temperature set point (Tset) with a first slope; and
increasing during a second sub-period of said second period of time the supply air temperature set point (Tset_slave) from said intermediate value to the first temperature set point (Tset) with a second slope;
wherein each one of said first and second slopes is predetermined or calculated as a function of at least one of said first temperature set point (Tset), said supply air temperature set point (Tset_slave) and measured values of the return air temperature (Tret) and the supply air temperature (Tsup).

4. A method according to claim 3, wherein the method comprises:
maintaining during a third sub-period arranged between said first and second sub-periods of said second period of time the supply air temperature set point (Tset_slave) at said intermediate value.

5. A method according to claim 1, wherein
said first period of time has a duration of less than 10 hours,
said second period of time has a duration of less than 90 hours; and
said predetermined value below said first temperature set point (Tset) is between 0.5 and 4° C. below said first temperature set point (Tset).

6. A method according to claim 1, wherein said predetermined value below said first temperature set point (Tset) is also below said desired temperature range around a first temperature set point (Tset).

7. A method according to claim 1, wherein the method comprises:
constraining the supply air temperature (Tsup) or a time-averaged function thereof to be above a minimum constraint; and
increasing the minimum constraint over time.

8. A system for controlling temperature in a refrigerated transport container, the refrigerated transport container comprising at least a transport volume and a cooling space, one or more fans providing an air flow through the cooling space, where air passing through the cooling space passes at least a return air temperature sensor for measuring a return air temperature (Tret), a cooling unit, and a supply air temperature sensor for measuring a supply air temperature (Tsup), wherein the system comprises a control unit configured to:
control supply air temperature (Tsup) to bring temperatures in the transport volume within a desired temperature range around a first temperature set point (Tset);
control the supply air temperature (Tsup) or a time-averaged function thereof to reach a temperature below said first temperature set point (Tset) during a first limited period of time;
increase the supply air temperature (Tsup) during a second limited period of time following said first period of time, so that the supply air temperature (Tsup) or a time-averaged function thereof at the end of said second period of time is within said desired temperature range;
control the supply air temperature (Tsup) or a time-averaged function thereof to a supply air temperature set point (Tset_slave);
set the supply air temperature set point (Tset_slave) during said first period of time to a value below said first temperature set point (Tset); and
increase the supply air temperature set point (Tset_slave) during said second period of time, so that the supply air temperature set point (Tset_slave) at the end of said second period of time is equal to said first temperature set point (Tset).

9. A system according to claim 8, wherein the control unit comprises:

a master controller configured to determine said supply air temperature set point (Tset_slave) as a function of at least one of said first temperature set point (Tset) and measured values of the return air temperature (Tret) and the supply air temperature (Tsup); and a slave controller configured to control the supply air temperature (Tsup) to said supply air temperature set point (Tset_slave).

10. A system according to claim 8, wherein the control unit is configured to:

increase during a first sub-period of said second period of time the supply air temperature set point (Tset_slave) from said value below said first temperature set point (Tset) to an intermediate value between said value below said first temperature set point (Tset) and the first temperature set point (Tset) with a first slope; and increase during a second sub-period of said second period of time the supply air temperature set point (Tset_slave) from said intermediate value to the first temperature set point (Tset) with a second slope;

wherein each one of said first and second slopes is predetermined or calculated as a function of at least one of said first temperature set point (Tset), said supply air temperature set point (Tset_slave) and measured values of the return air temperature (Tret) and the supply air temperature (Tsup).

11. A system according to claim 10, wherein the control unit is configured to:

maintain during a third sub-period arranged between said first and second sub-periods of said second period of time the supply air temperature set point (Tset_slave) at said intermediate value.

12. A system according to claim 8, wherein said first period of time has a duration of less than 10 hours, said second period of time has a duration of less than 90 hours; and said predetermined value below said first temperature set point (Tset) is between 0.5 and 4° C. below said first temperature set point (Tset).

13. A system according to claim 8, wherein said predetermined value below said first temperature set point (Tset) is also below said desired temperature range around a first temperature set point (Tset).

14. A system according to claim 8, wherein the control unit is configured to:

determine, without human intervention, whether at least one indicator indicates that temperatures in the transport volume are distinctly above said desired temperature range, wherein said at least one indicator is a function of at least one of the duration of preceding power off periods, measured return air temperature (Tret) and measured supply air temperature (Tsup) within a predetermined amount of time after activation of the controller; and reduce the supply air temperature (Tsup) or a time-averaged function thereof to said temperature below said first temperature set point (Tset) only if said at least one indicator indicates that temperatures in the transport volume are distinctly above the said desired temperature range.

15. A system according to claim 8, wherein the control unit is configured to:

check upon activation of the controller if and since when the controller state at the end of the preceding power-on period was in said first period of time or in said second period of time; and taking that information into account when initializing the supply air temperature controller.

16. A non-transient computer readable medium having stored thereon program code for performing the method of claim 1 when said program code is run on a computer.

* * * * *